US006432583B1

(12) United States Patent
Fukuda et al.

(10) Patent No.: US 6,432,583 B1
(45) Date of Patent: Aug. 13, 2002

(54) ANODE MATERIAL FOR LITHIUM SECONDARY BATTERY, PROCESS FOR PRODUCTION THEREOF, AND LITHIUM SECONDARY BATTERY

(75) Inventors: Kenji Fukuda; Youichiro Hara; Tatsuo Umeno; Takashi Hiruta; Yoshinori Yasumoto; Tadanori Tsunawaki, all of Fukuoka; Katsusuke Iwanaga; Osamu Matsunaga, both of Tochigi, all of (JP)

(73) Assignee: Mitsui Mining Co., Ltd., Tokyo (JP)

( * ) Notice: Subject to any disclaimer, the term of this patent is extended or adjusted under 35 U.S.C. 154(b) by 0 days.

(21) Appl. No.: 09/492,453

(22) Filed: Jan. 27, 2000

Related U.S. Application Data

(63) Continuation-in-part of application No. 09/334,928, filed on Jun. 17, 1999.

(30) Foreign Application Priority Data

Jul. 31, 1998 (JP) .......................................... 10-230196

(51) Int. Cl.$^7$ ................................................ H01M 4/48
(52) U.S. Cl. .................................. 429/231.4; 429/231.8
(58) Field of Search .......................... 429/231.4, 231.8; 423/447.8, 448

(56) References Cited

U.S. PATENT DOCUMENTS

| | | | | |
|---|---|---|---|---|
| 4,835,075 A | * | 5/1989 | Tajima et al. ................. | 429/194 |
| 5,380,516 A | * | 1/1995 | Tanabe et al. ................. | 423/446 |
| 5,451,477 A | * | 9/1995 | Omaru et al. ................. | 429/218 |
| 5,624,506 A | * | 4/1997 | Wilson et al. ................. | 252/506 |
| 5,624,719 A | * | 4/1997 | Tanabe et al. ................. | 427/577 |
| 5,658,691 A | * | 8/1997 | Suzuki et al. ................. | 429/218 |
| 5,753,387 A | * | 5/1998 | Takami et al. ................. | 429/194 |
| 5,773,167 A | * | 6/1998 | Iwasaki et al. ................ | 429/218 |
| 5,888,671 A | * | 3/1999 | Yamasaki et al. ............ | 429/232 |
| 5,908,715 A | * | 6/1999 | Liu et al. ........................ | 429/217 |
| 6,001,507 A | * | 12/1999 | Ono et al. ...................... | 429/217 |
| 6,066,413 A | * | 5/2000 | Aymard et al. ............... | 429/217 |
| 6,087,043 A | * | 7/2000 | Tossici et al. ................. | 429/231.4 |
| 6,139,989 A | * | 10/2000 | Kawakubo et al. ......... | 429/231.8 |

FOREIGN PATENT DOCUMENTS

| | | |
|---|---|---|
| EP | 0 782 207 | 7/1997 |
| EP | 0 977 292 | 2/2000 |
| JP | 5-121066 | 5/1993 |
| JP | 5-275076 | 10/1993 |
| JP | 2643035 | 5/1997 |

OTHER PUBLICATIONS

U.S. application No. 09/488,714, filed Jan. 21, 2000, pending, Docket No. 2166–0009–0.
U.S. application No. 09/492,453, filed Jan. 27, 2000, pending, Docket No. 2166–0010–0 CIP.
Patent Abstracts of Japan, vol. 010, No. 377 (C–392), Dec. 16, 1986, JP 61 171765, Aug. 2, 1986.

* cited by examiner

Primary Examiner—M. Alexandra Elve
Assistant Examiner—Zidia Pittman
(74) Attorney, Agent, or Firm—Oblon, Spivak, McClelland, Maier & Neustadt, P.C.

(57) ABSTRACT

According to the present invention, there are disclosed:
  a process for producing an anode material for lithium secondary battery, comprising graphite particles and a crystalline carbon layer covering the whole surfaces of the graphite particles, wherein the whole surfaces of the graphite particles are covered with a carbon layer in a state that the surfaces of the graphite particles and the carbon 002 plane of the carbon layer are parallel, which process comprises subjecting graphite particles to a treatment for chemical vapor deposition in a fluidized bed type reactor at 900 to 1,200° C., using a mixed gas consisting of an organic substance gas and an inert gas, the molar concentration of the organic substance gas in the mixed gas being 2 to 50%; and
  an anode material for lithium secondary battery, produced by the above process.

19 Claims, 9 Drawing Sheets

10nm

ANODE MATERIAL FOR LITHIUM SECONDARY BATTERY, PROCESS FOR PRODUCTION THEREOF, AND LITHIUM SECONDARY BATTERY

This application is a Continuation-in-part (CIP) of application Ser. No. 09/334,928 Filed on Jun. 17,1999, Pending.

BACKGROUND OF THE INVENTION

1. Field of the Invention

The present invention relates to an anode material enabling production of a lithium secondary battery having a large capacity, a high voltage and excellent charge-discharge cycle property and free from decomposition of solvents of electrolytic solution; a process for production of the anode material; and a lithium secondary battery containing the anode material.

2. Description of the Related Art

As electronic appliances have become smaller and lighter, the batteries used therein are required to have a higher energy density. It is also required to develop a high-performance secondary battery allowing repeated charge and discharge, from the standpoint of resource saving. In order to respond to these requirements, lithium secondary batteries of high energy density, light weight, small size and excellent charge-discharge cycle property have been proposed.

Lithium secondary batteries are classified, depending upon the kind of the electrolyte used therein, into lithium-ion secondary battery, lithium polymer battery, completely solid-state lithium secondary battery, etc. Of these secondary batteries, lithium-ion secondary battery is drawing particular attention for solving the problems of lithium metal secondary battery such as low charge speed, short cycle life, low safety and the like, and research and development are being continued on lithium-ion secondary battery.

Lithium metal secondary battery uses lithium metal for the anode. In contrast, lithium-ion secondary battery uses a carbon material for the anode and, by using a carbon material for the anode, it is intended to satisfy the above-mentioned requirements. That is, in lithium-ion secondary battery whose cathode is constituted by a lithium compound and whose anode is constituted by a carbon material, when the battery is in a charge stage, the carbon material is doped with lithium ion at the anode, whereby a so-called carbon-lithium intercalation compound is formed. Meanwhile, when the battery is in a discharge stage, lithium ion is undoped from between the adjacent layers of the carbon material, and the undoped lithium ion migrates back to the cathode and returns to the lithium compound. Owing to such a mechanism, lithium-ion secondary battery enables repeated charge and discharge.

As the anode used in lithium-ion secondary battery, there are a graphite type anode and a carbon type anode. When a battery produced using one of such anodes is subjected to long-term discharge in disregard for practical usability, the discharge capacity of the carbon type anode is 600 mAh/g or more. This discharge capacity is large as compared with the discharge capacity (350 to 370 mAh/g) of the graphite type anode in practical use. The discharge capacity of the carbon type anode in practical use, however, is 250 to 300 mAh/g and is small as compared with the discharge capacity (350 to 370 mAh/g) of the graphite type anode in practical use. Further, the carbon type anode is low in density (of the carbon material used therein) and also in discharge voltage. Therefore, a battery using the carbon type anode is inferior also in discharge energy, as compared with a battery using the graphite type anode. For the above-mentioned reasons, the graphite type anode is used in many lithium-ion secondary batteries.

In lithium-ion secondary battery using a graphite type anode, it is desired for efficient charge and discharge in a short time that the graphite constituting the graphite anode is in the form of fine particles. It is thought that when the graphite is in the form of fine particles, the contact area between graphite and electrolytic solution in battery is larger and, as a result, the transfer of lithium ion between electrolytic solution and graphite is easier.

The present inventors made a study on the use of fine graphite particles for the anode of lithium-ion secondary battery. As a result, an increase in discharge capacity of battery was confirmed by the use of fine graphite particles. However, the use of fine graphite particles brought about an increase in the charge amount necessary for battery operation and a resultant decrease in coulombic efficiency. Further, the use of fine graphite particles increased the reactivity of the graphite with the solvent constituting the electrolytic solution of battery, which invited decomposition of the solvent and generation of striking amount of gas. The generation of gas in closed battery incurs an increase in the internal pressure of battery and a high risk of battery explosion. Therefore, it is extremely important to suppress the generation of gas inside battery.

In general, the main solvent of the electrolytic solution used in lithium-ion secondary battery is, in many cases, a carbonic acid ester such as ethylene carbonate (hereinafter referred to as EC), propylene carbonate (hereinafter referred to as PC) or the like. This main solvent is mixed with an electrolyte such as $LiPF_6$, $LiBF_4$ or the like, whereby an electrolytic solution is obtained. The reason why a solvent such as PC, EC or the like is used as the main solvent of electrolytic solution is that these solvents have desired solvent properties such as high relative dielectric constant, operability in wide temperature range and the like. PC, in particular, is a solvent usable at low temperatures. However, when an electrolytic solution containing PC is allowed to co-exist with a graphite type anode in a battery, PC is decomposed and generates a gas, as mentioned above. This decomposition of PC is seen only when graphite is used as the anode of battery, and is not seen when a carbon type anode is used.

As mentioned above, coexistence of PC-containing electrolytic solution and graphite type anode in battery gives rise to PC decomposition. As a result, the coulombic efficiency of battery decreases; moreover, the internal pressure of battery increases, leading to a high risk of battery explosion. Hence, it is desired to develop such a graphite type anode that gives rise to no PC decomposition when a PC-containing electrolytic solution is used and that causes no reduction in coulombic efficiency, i.e. a graphite type anode highly resistant to PC decomposition.

There have hitherto been proposed methods for suppressing PC decomposition by covering the surfaces of graphite particles with low-crystalline carbon which causes no PC decomposition.

As examples of such methods, there are mentioned a method (disclosed in Japanese Patent No. 2643035) of using, as an anode material, a composite material obtained by covering graphite with low-crystalline carbon by chemical vapor deposition; a method (disclosed in Japanese Patent Application Laid-open Hei-5-121066) of using, as an anode material, a composite material obtained by covering graphite with carbon having an average layer spacing $d_{002}$ of 0.337 nm or more; and a method (disclosed in Japanese Patent Application Laid-open Hei-5-275076) of using, as an anode material, a composite material obtained by covering graphite with amorphous carbon.

The anodes produced using one of the above composite materials can suppress PC decomposition. However, a battery using such an anode produced from a composite material, as compared with a battery using an anode produced from graphite particles alone, has problems possessed by low-crystalline carbon, such as small discharge capacity in practical use, low speed in charge and discharge, and the like.

The carbon type anode or the graphite type anode, each used in lithium-ion secondary battery has problems possessed by the carbon type material used in the former anode, or problems possessed by the graphite type material used in the latter anode; and these problems run counter to each other. Hence, it is desired to develop an anode material for lithium-ion secondary battery capable of solving all of the above problems, and a lithium-ion secondary battery using such an anode material.

SUMMARY OF THE INVENTION

The present inventors examined the usability, as an anode material for lithium-ion secondary battery, of a graphite-carbon composition material obtained by covering graphite with carbon by chemical vapor deposition under various conditions. As a result, it was found out that when there is used, as an anode material for lithium-ion secondary battery, a graphite-carbon composite material obtained by covering the surface of graphite with crystalline carbon uniformly and completely, the anode material can reliably suppress the decomposition of PC or the like; the battery using the anode material is high in discharge capacity and allows rapid charge; the anode material has electrode performances superior to those of conventional anode materials covered with low-crystalline carbon. It was further found out that the above anode material is usable in any of lithium secondary batteries such as lithium polymer secondary battery, solid-state lithium secondary battery, lithium-ion secondary battery and the like.

It was furthermore found out that when lithium ion is intercalated into the above anode material and the resulting material is measured for $^7$Li-NMR spectrum, the spectrum can be used for measurement of the crystallinity of the above anode material. These findings have led to the completion of the present invention.

The present invention aims at providing an anode material capable of producing a lithium secondary battery which alleviates the above-mentioned problems of the prior art, which suppresses the decomposition of solvent of electrolytic solution, and which is high in discharge capacity and enables rapid charge and discharge; a process for production of such an anode material; and a lithium secondary battery produced using such an anode material.

The present invention lies in the followings.

[1] An anode material for lithium secondary battery, comprising graphite particles and a crystalline carbon layer covering the whole surfaces of the graphite particles, wherein the whole surfaces of the graphite particles are covered with a carbon layer in a state that the surfaces of the graphite particles and the carbon 002 plane of the carbon layer are parallel.

[2] An anode material for lithium secondary battery according to [1], which has absorption spectra at 40 to 50 ppm and 10 to 30 ppm when lithium ion is intercalated thereinto and the resulting material is measured for $^7$Li-NMR spectrum using lithium chloride as a standard.

[3] An anode material for lithium secondary battery according to [1], wherein the carbon layer shows optical anisotropy under a polarizing microscope.

[4] An anode material for lithium secondary battery according to [1], wherein natural graphite is used as the graphite particles.

[5] A lithium secondary battery produced using an anode material set forth in any of [1] to [4].

[6] A process for producing an anode material for lithium secondary battery, comprising graphite particles and a crystalline carbon layer covering the surfaces of the graphite particles, which process comprises subjecting graphite particles to a treatment for chemical vapor deposition using an organic substance gas or a mixed gas consisting of an organic substance gas and an inert gas, in a fluidized bed type reactor to form a carbon layer on the surfaces of the graphite particles.

[7] A process according to [6], wherein the carbon layer is a crystalline carbon layer and the whole surfaces of the graphite particles are covered with the carbon 002 plane of the crystalline carbon layer.

[8] A process according to [6], wherein the molar concentration of the organic substance gas in the mixed gas is 2 to 50% and the temperature of the treatment for chemical vapor deposition is 900 to 1,200° C.

[9] A process according to [6], wherein natural graphite is used as the graphite particles.

DETAILED DESCRIPTION OF THE INVENTION

Figure 1:
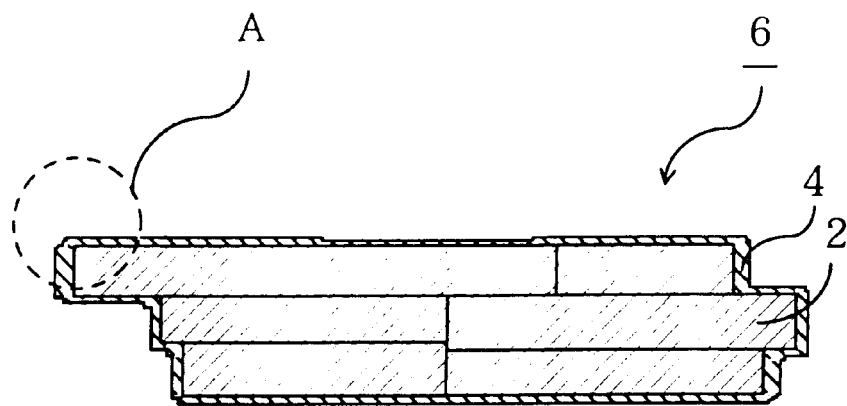
FIG. 1 is a schematic sectional view showing an example of the anode material for lithium secondary battery, of the present invention.

The anode material for lithium secondary battery, of the present invention is a graphite-carbon composite material comprising graphite particles and a carbon layer covering the surfaces of the graphite particles. The carbon layer is a layer of crystalline carbon having desired molecular orientation, which can be formed by chemical vapor deposition.

As the anode material for lithium secondary battery, there are a carbon type or graphite type anode material (which is a main material) and a paste, a conductive material, etc. (which are each an auxiliary material). In the present invention, the term "anode material" for lithium secondary battery refers to a carbon type or graphite type anode material which is a main material, unless otherwise specified.

In the present invention, the graphite used as a material for the graphite particles may be natural graphite or artificial graphite and is desired to be high-crystalline graphite having an average layer spacing $d_{002}$ of 0.336 nm or less. Desirably, the material graphite is ground to a size of maximum particle diameter of 100 μm or less. The average particle diameter is preferably 5 to 30 μm, more preferably 10 to 20 μm.

The grinding of graphite may be conducted by any known method such as impact grinding, attrition or the like. As to the tap density of the graphite particles after grinding, there is no particular restriction; however, the tap density is desirably 0.7 g/cm³ or more for handling. When the tap density of the graphite particles after grinding is less than 0.7 g/cm³, the graphite particles are subjected to a compaction treatment by the use of a compactor, a roller mill, a disc mill, a vibration mill or the like so as to have a tap density of 0.7 g/cm³ or more, whereby the resulting particles allows easy handling.

As the method for covering graphite particles with carbon for formation of a carbon layer on the surfaces of the graphite particles, there are known a method of kneading graphite particles with a pitch or a resin to cover the graphite particles with the pitch or the resin and then carbonizing the pitch or resin; and a method by chemical vapor deposition on fixed bed.

In the method of kneading graphite particles with a pitch or a resin, followed by carbonization, volume contraction takes place when the coated pitch or resin is carbonized; as a result, cracks or peeling appears on the surface carbon layer; thus, it is impossible to cover the graphite particles completely with carbon.

In the method by chemical vapor deposition on fixed bed, graphite particles are placed, for example, on a graphite plate provided in a quartz tube; into the quartz tube is continuously fed a mixed gas consisting of an organic substance gas (as a carbon source) and a diluent gas; in this state, the mixed gas is heated to a temperature at least equal to the thermal decomposition temperature of the organic substance. In this method, the graphite particles are covered with carbon only at the areas which come into contact with the mixed gas. In the method, therefore, many uncovered areas remain on the surfaces of the graphite particles. Thus, in the method by chemical vapor deposition on fixed bed, there are cases that complete coverage of graphite particle surfaces with carbon is impossible.

In contrast to these covering methods, in the chemical vapor deposition using a fluidized bed, the outer surfaces of the graphite particles are covered with carbon easily and completely and the carbon deposited on the graphite particles is mainly crystalline. Therefore, in the present invention, chemical vapor deposition is conducted preferably using a fluidized bed reactor. By conducting chemical vapor deposition using a fluidized bed reactor, the chemical vapor deposition can be carried out efficiently and on a large scale, and the surfaces of the graphite particles can be covered with deposited carbon uniformly.

In the chemical vapor deposition using a fluidized bed, the graphite particles in a fluidized bed reactor form a fluidized layer. The fluidized layer desirably has a bulk density of 0.1 to 0.5 g/cm³.

The temperature of chemical vapor deposition is preferably 850 to 1,200° C., more preferably 900 to 1,200° C., further preferably 950 to 1,150° C. The temperature of chemical vapor deposition differs depending upon the kind of the organic substance used as a carbon source in the deposition. A temperature of chemical vapor deposition lower than 850° C. is not preferred because, at such a temperature, the deposition speed of pyrolytic carbon is small and a long time is needed for chemical vapor deposition.

As the temperature of chemical vapor deposition is higher, the conversion of organic substance into carbon is higher. However, when the temperature of chemical vapor deposition is higher than 1,200° C., the deposited carbon grows in a fibrous state or in an amorphous soot state and hardly grows in a film state. Therefore, in the present invention wherein formation of carbon in a uniform film state is aimed, it is not preferred to conduct chemical vapor deposition at a temperature higher than 1,200° C.

As the organic substance preferred as the carbon source of chemical vapor deposition, there can be mentioned monocyclic to tricyclic aromatic hydrocarbons and their derivatives, such as benzene, toluene, xylene, styrene, ethylbenzene, diphenylmethane, diphenyl, naphthalene, phenol, cresol, nitrobenzene, chlorobenzene, indene, coumarone, pyridine, anthracene, phenanthrene and the like; and mixtures thereof. Of these compounds, monocyclic benzene derivatives such as benzene, toluene, xylene, styrene and the like are preferred because they hardly form tar during chemical vapor deposition.

There can also be mentioned gas light oil, creosote oil and anthracene oil, all obtained when coal tar is subjected to distillation; petroleum-based cracked oil; tar oil obtained by naphtha cracking; aliphatic hydrocarbons such as methane, ethane, propane, butane, pentane, hexane and the like; and alcohols which are derivatives of the aliphatic hydrocarbons. These organic substances can be used singly or in admixture. There can further be used organic substances containing double or triple bond such as acetylene, ethylene, propylene, isopropylene, butadiene and the like.

The amount of the carbon deposited on the graphite particles by chemical vapor deposition is preferably 2 to 30% by weight, more preferably 7 to 25% by weight based on the graphite particles. By covering the graphite particles with 2% by weight or more of carbon, the decomposition of the solvent of electrolytic solution can be suppressed. When the amount of the carbon deposited on the graphite particles is more than 30% by weight, the effect of carbon for suppression of solvent decomposition substantially reaches saturation, and bonding between carbon-covered graphite articles becomes striking and agglomeration of particles is invited; therefore, such a large amount is not preferred.

In the chemical vapor deposition, the organic substance fed into a fluidized bed reactor as a carbon source is preferably fed in a state of a mixed gas consisting of an organic substance gas and an inert gas as a diluent. As the inert gas, there can be mentioned nitrogen, argon, etc. Nitrogen is particularly preferred for the availability and easy handling.

In conducting chemical vapor deposition in a fluidized bed reactor, the inert gas has important roles of (1) discharging oxygen and an unreacted residual organic substance from the reaction system and (2) functioning as a fluidizing medium for forming a fluidized bed of graphite particles.

The concentration of the organic substance gas in the mixed gas has a large influence on the crystallinity and molecular orientation of the carbon deposited on the graphite particles. The molar concentration of the organic substance gas in the mixed gas is preferably 2 to 50%, more preferably 5 to 33%. By controlling the organic substance gas concentration in the mixed gas, in the above range, a carbon layer of desired crystallinity and molecular orientation can be easily formed on the graphite particles. When the molar concentration of the organic substance gas in the mixed gas is lower than 2%, the carbon layer formed by chemical vapor deposition has high crystallinity, but the deposition rate of pyrolytic carbon is small and a long time is needed for chemical vapor deposition; therefore, such a concentration is not preferred. Meanwhile, when the molar concentration of the organic substance gas in the mixed gas is higher than 50%, the deposition rate of pyrolytic carbon is large; however, the carbon layer formed by chemical vapor deposition has low crystallinity and the deposited carbon grows in a fibrous or soot state and not in a film state; therefore, such a concentration is not preferred in the present invention wherein uniform formation of carbon layer on graphite particles is aimed at.

By appropriately selecting the above-mentioned parameters and conducting chemical vapor deposition, it is possible to allow the carbon layer formed on the graphite particles, to have an average plane spacing $d_{002}$ of less than 0.337 nm, preferably 0.3352 to 0.3369 nm, more preferably 0.3352 to 0.3359 nm. However, the average plane spacing of the carbon layer need not be in the above range.

Next, the results obtained when the anode material produced as above has been observed using a transmission electron microscope, etc., are described with reference to accompanying drawings. The features of the carbon layer formed on graphite particles by chemical vapor deposition are as follows.

FIG. 1 shows an example of the anode material of the present invention. The anode material 6 shown in the schematic sectional view of FIG. 1 comprises graphite particles 2 of substantially plate-like shape and a carbon layer 4 uniformly covering the graphite particles.

Figure 2:
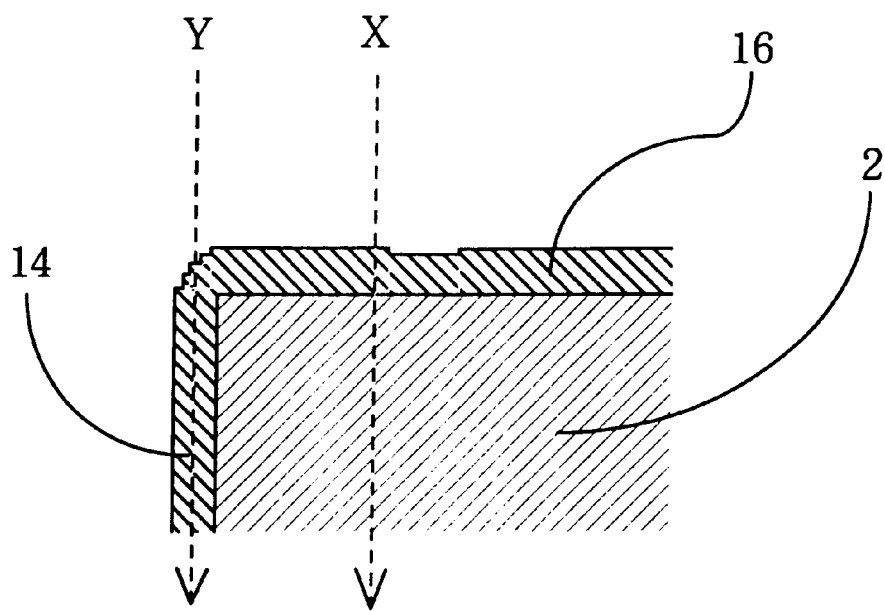
FIG. 2 is an enlarged view of the part A of the anode material shown in FIG. 1.

FIG. 2 is an enlarged view of the part defined by a broken line A in FIG. 1. By investigating, in FIG. 2, the molecular orientations of the graphite particles 2 and the carbon layer 4 in detail, the following matters are known.

As shown in FIG. 2, the graphite particles 2 of substantially plate-like shape are covered, at the plate side (110 plane), with a side carbon layer 14 and, at the plate top (002 plane), with a top carbon layer 16.

In FIG. 2, when an electron beam X of transmission electron microscope is applied downward from above to observe the top carbon layer 16, it is impossible to observe the clear lattice image of carbon 002 plane. However, the carbon 002 plane can be observed when electron diffractometry is used.

Meanwhile, when an electron beam Y of transmission electron microscope is applied downward from above to observe the side carbon layer 14, it is possible to observe the clear lattice image of carbon 110 plane. Therefore, it is theoretically concluded that the side carbon layer 14 has a crystalline structure and the carbon 002 plane of the side carbon layer 14 is parallel to the surface of each graphite particle.

The above observation results indicate that the carbon 002 plane of graphite particle surface is covered with the carbon 002 plane of the carbon layer and that the carbon 110 plane of graphite particle surface is as well covered with the carbon 002 plane of the carbon layer.

Hence, it is clear that the anode material of the present invention has such a structure that the whole surfaces of graphite particles are covered with the carbon 002 plane of the carbon layer.

Incidentally, by observation using a transmission electron microscope and by measuring the spacing between carbon 002 planes of carbon layer, it is possible to examine the crystallinity and molecular orientation of the formed carbon layer.

Further, when lithium ion is intercalated into the anode material produced as above and the resulting material is measured for $^7$Li-NMR spectrum, the spectrum can be used for the structural analysis of the anode material.

Specifically, the anode material is made into an anode; lithium ion is intercalated into the anode; and the anode is measured for $^7$Li-NMR spectrum. When the $^7$Li-NMR spectrum obtained is a double spectrum consisting of an absorption spectrum at 40 to 50 ppm and an absorption spectrum at 10 to 30 ppm based on lithium chloride (0 ppm), the anode material used is suitable as an anode material for lithium secondary battery.

Here, the absorption spectrum at 40 to 50 ppm is an absorption spectrum given by the lithium ion intercalated into the highly crystalline graphite particles; and the absorption spectrum at 10 to 30 ppm is an absorption spectrum given by the lithium ion intercalated into the crystalline carbon layer. The presence of these two spectra, their positions, and no presence of absorption spectrum at 90 to 120 ppm characterize the anode material of the present invention and are particularly important because the crystallinity of the carbon layer is confirmed by them.

Meanwhile, when lithium ion is intercalated into an anode material obtained by covering graphite particles with amorphous carbon and the resulting material is measured for $^7$Li-NMR spectrum, the spectrum contains no absorption spectrum at 10 to 30 ppm and an absorption spectrum is seen at 90 to 120 ppm.

Further, when lithium ion is intercalated into an anode material obtained by covering graphite particles with low-crystalline carbon and the resulting material is measured for $^7$Li-NMR spectrum, the spectrum contains absorption spectra at 10 to 30 ppm and 90 to 120 ppm in some cases.

The above results of measurement by electron microscope and NMR spectrometry indicate that the whole surfaces of graphite particles are covered with the carbon 002 plane of the carbon layer and that the carbon layer has a crystalline carbon structure.

Hence, in the present invention, the crystalline carbon layer can be defined as a carbon layer having a carbon 002 plane whose presence can be confirmed by a transmission electron microscope, electron diffraction and NMR spectrometry.

Further, the carbon layer of the anode material of the present invention produced by chemical vapor deposition has the following properties.

(1) The carbon deposited by chemical vapor deposition (the carbon is hereinafter referred to as deposited carbon) is greatly affected by the molecular orientation of graphite particles; therefore, when the graphite particles has a small average plane spacing, the deposited carbon has as well a small average plane spacing.

(2) The carbon layer formed on graphite particles by vapor deposition is sufficiently crystallized to such an extent that the molecular orientation can be confirmed by a polarizing microscope. Further, the carbon layer formed on graphite particles is sufficiently crystallized to such an extent that the crystal structure can be confirmed even by a scanning electron microscope.

(3) The average plane spacing $d_{002}$ of the carbon layer formed on graphite particles is very close to and slightly larger than the average plane spacing of graphite particles. Specifically, the average plane spacing $d_{002}$ of the carbon layer is 0.3352 to 0.3369 nm.

Figure 3:
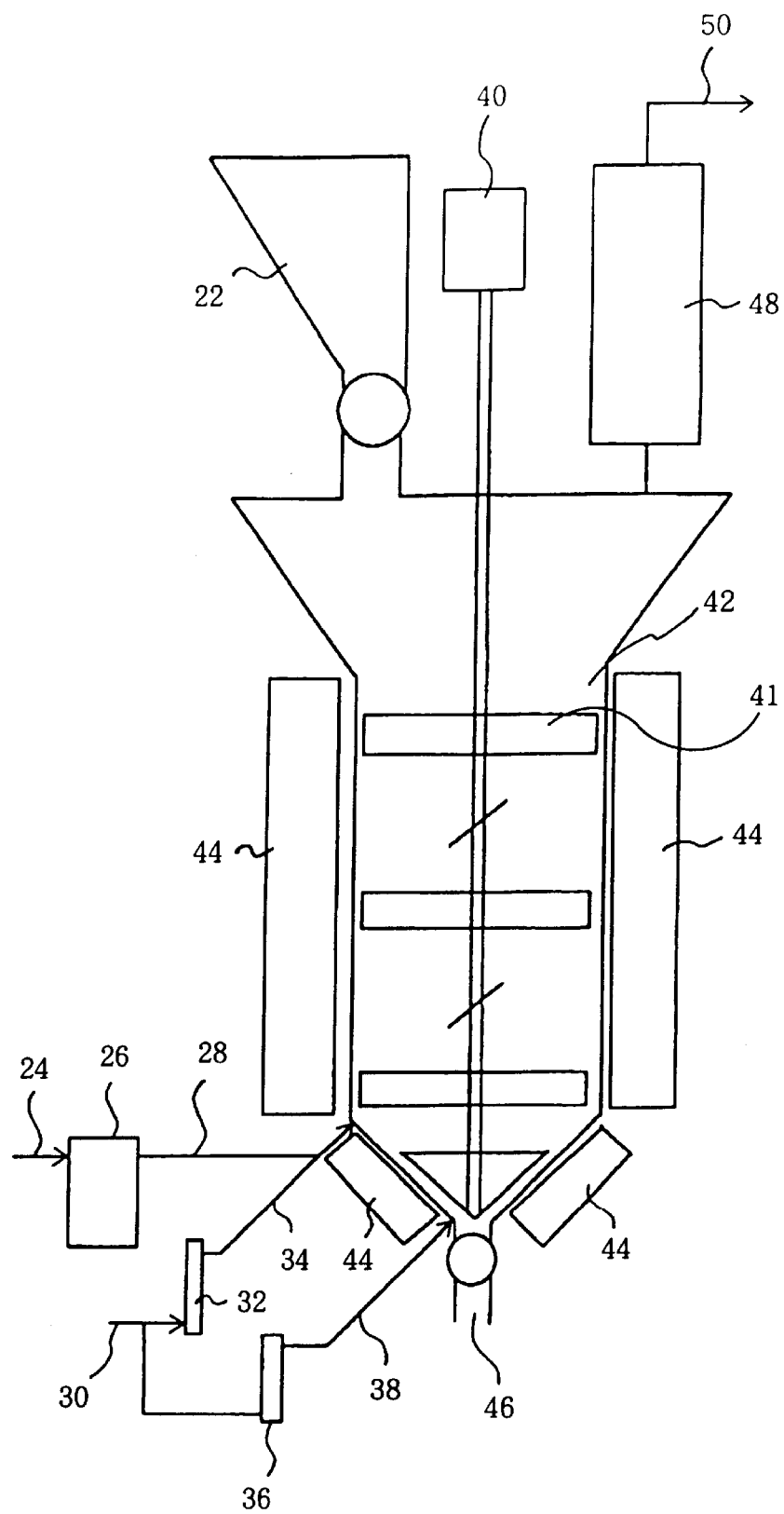
FIG. 3 is a schematic view showing an example of the apparatus for chemical vapor deposition, used for production of the anode material for lithium secondary battery, of the present invention.

FIG. 3 shows an example of the fluidized bed type chemical vapor deposition apparatus used in production of the anode material of the present invention.

In producing the anode material of the present invention, it is preferred that graphite particles are subjected to chemical vapor deposition in a fluidized state. Here, the fluidized state refers to a state in which a gas is fed from the bottom of a reactor 42 to impart buoyancy to graphite particles and thereby each graphite particle floats in the reactor 42 and makes a violent and irregular movement. The fluidized graphite particles are called a fluidized layer or a fluidized bed because they have a distinct interface at the top. The volume of the fluidized graphite particles is often about 1.2 to 1.6 times the volume of graphite particles when allowed to stand.

The gas used for fluidization is preferably an organic substance gas (which is a carbon source) or a mixed gas consisting of an organic substance gas and an inert gas.

When fluidization of graphite particles is conducted by the use of a gas flow alone, it is preferable to provide a known straightening vane (not shown) at the bottom of the reactor 42 to make the gas flow uniform to the section of the reactor 42. If the gas flow is nonuniform, it is impossible to obtain a uniform fluidized layer and, in an extreme case, a gas may flow through the fluidized layer in a bubble state or may form a special gas passage (a rathole) and no fluidized layer may be formed.

In the present invention, fluidization of graphite particles may be conducted by the use of a gas flow alone. However, when no stable fluidized layer is obtained owing to the properties of graphite particles, it is preferred to provide a stirrer 40 inside the reactor 42 and stir the graphite particles, whereby a uniform fluidized layer can be formed reliably. In forming a carbon layer on graphite particles by vapor deposition, the rotational speed of each impeller 41 at the end is preferably 250 to 20,000 cm/min. When the rotational speed is lower than 250 cm/min, carbon deposition tends to occur on the impellers although the extent of carbon deposition differs depending upon the vapor deposition conditions such as reaction temperature and the like. When the rotational speed is higher than 20,000 cm/min, the scattering of particles is striking, reducing the yield of anode material.

In place of the stirrer 40 or in addition to the stirrer 40, a vibrator (not shown) may be provided outside the reactor 42 to vibrate the reactor 42, whereby graphite particles are indirectly vibrated and a uniform fluidized layer can be formed. The vibration applied differs depending upon the size of reactor 42, etc. but can preferably be, for example, 2 to 30 Hz (resonance frequency) and 0.2 to 30 mm (amplitude). The vibration can be easily generated by an ordinary electric vibrator.

The operation of vapor deposition may be batch-wise or continuous. When the operation is conducted batch-wise, graphite particles are fed into the reactor 42 from a graphite hopper 22. When the operation is conducted continuously, there is no particular restriction as to the means for feeding of graphite particles, but they can be fed into the reactor 42 by the use of, for example, a metering type screw feeder (not shown). There is no particular restriction as to the position through which graphite particles are fed into the reactor 42, because graphite particles is in a fluidized and completely mixed state in the reactor 42. The graphite particles in this fluidized state are subjected to chemical vapor deposition, whereby an anode material of the present invention is formed in the reactor 42.

To discharge the formed anode material continuously from inside the reactor 42, there can be used, for example, a metering type screw feeder connected to an outlet 46 for anode material, of the reactor 42. The formed anode material can also be discharged by allowing it to overflow at the fluidized layer top.

The fluidized layer has very good thermal conductivity. Therefore, in order to heat the fluidized layer to a desired temperature for chemical vapor deposition, the fluidized layer is ordinarily heated from outside the reactor 42 by the use of an electric heater 44. A mixed gas may be preheated as necessary.

In FIG. 3, numeral 24 refers to a carbon source; numeral 26 refers to a metering liquid pump; numeral 28 refers to a carbon source transfer line; numeral 30 refers to an inert gas; numeral 32 refers to a gas flow meter; numeral 34 refers to an inert gas-carbon source mixing line; numeral 36 refers to a gas flow meter; numeral 38 refers to an inert gas line; numeral 48 refers to a bag filter; and numeral 50 refers to an exhaust gas line.

The average particle diameter of graphite particles is preferably 1 to 100 $\mu$m as mentioned previously. This particle diameter is particularly preferred when chemical vapor deposition is conducted in a fluidized bed reactor. When the average particle diameter of graphite particles is smaller than 1 $\mu$m, it is substantially difficult to completely cover the graphite particles with carbon and, moreover, the amount of the graphite particles discharged out of the reaction system by a gas flow is large, reducing the yield of anode material. Meanwhile, when the average particle diameter is larger than 100 $\mu$m, formation of a uniform fluidized layer is difficult in some cases.

The true density of graphite particles is about 2 g/cm$^3$. The preferred range of the bulk density of graphite particles of fluidized state during chemical vapor deposition is about 0.1 to 0.5 g/cm$^3$. As the bulk density of graphite particles of fluidized state is smaller, there is a tendency that chemical vapor deposition takes place more uniformly. However, when the bulk density of graphite particles of fluidized state is smaller than 0.1 g/cm$^3$, a further reduction in bulk density brings about no further improvement in uniformity of vapor deposition; rather, in order to obtain a bulk density smaller than 0.1 g/cm$^3$, a larger apparatus is needed and a larger amount of a gas must be fed for fluidization of graphite particles, requiring a larger amount of energy for heating of the gas. Meanwhile, when the bulk density of graphite particles of fluidized state is larger than 0.5 g/cm$^3$, the gas in the reactor causes channeling, making it difficult for the graphite particles to maintain its uniform fluidized state; as a result, it is difficult to conduct chemical vapor deposition uniformly.

The fluidized layer having the above bulk density can be seen as a preferred environment for conducting chemical vapor deposition, in view of the proportion of the particle volume in the reactor space, as shown below. The true density of graphite particles is about 2 g/cm$^3$; therefore, when a good fluidized state of graphite particles having a bulk density of 0.2 g/cm$^3$ is formed in chemical vapor deposition, the proportion of graphite particles in reactor space becomes 10% by volume. This means that 90% of the reactor inside volume is occupied by a gas and this is 9 times the volume of the graphite particles. As a result, the graphite particles make a violent irregular movement in a sufficiently large space. In chemical vapor deposition in such a fluidized state, sufficient solid-gas contact is achieved; efficiency of solid-gas contact is high; as a result, conversion from organic substance into carbon is high. Further, the carbon layer formed by vapor deposition is uniform. Furthermore, since solid-gas contact is conducted in a fluidized layer, a sufficiently large space is secured for the violent irregular movement of graphite particles. Thereby, troubles such as mutual bonding of graphite particles and the like can be avoided. In contrast, conventional chemical vapor deposition is conducted on a fixed bed. Therefore, efficiency of solid-gas contact is low, and troubles such as mutual bonding of graphite particles and the like appear easily.

The apparatus used in production of the anode material of the present invention by chemical vapor deposition in a fluidized state can be any apparatus as long as it enables chemical vapor deposition on fluidized bed.

Figure 4:
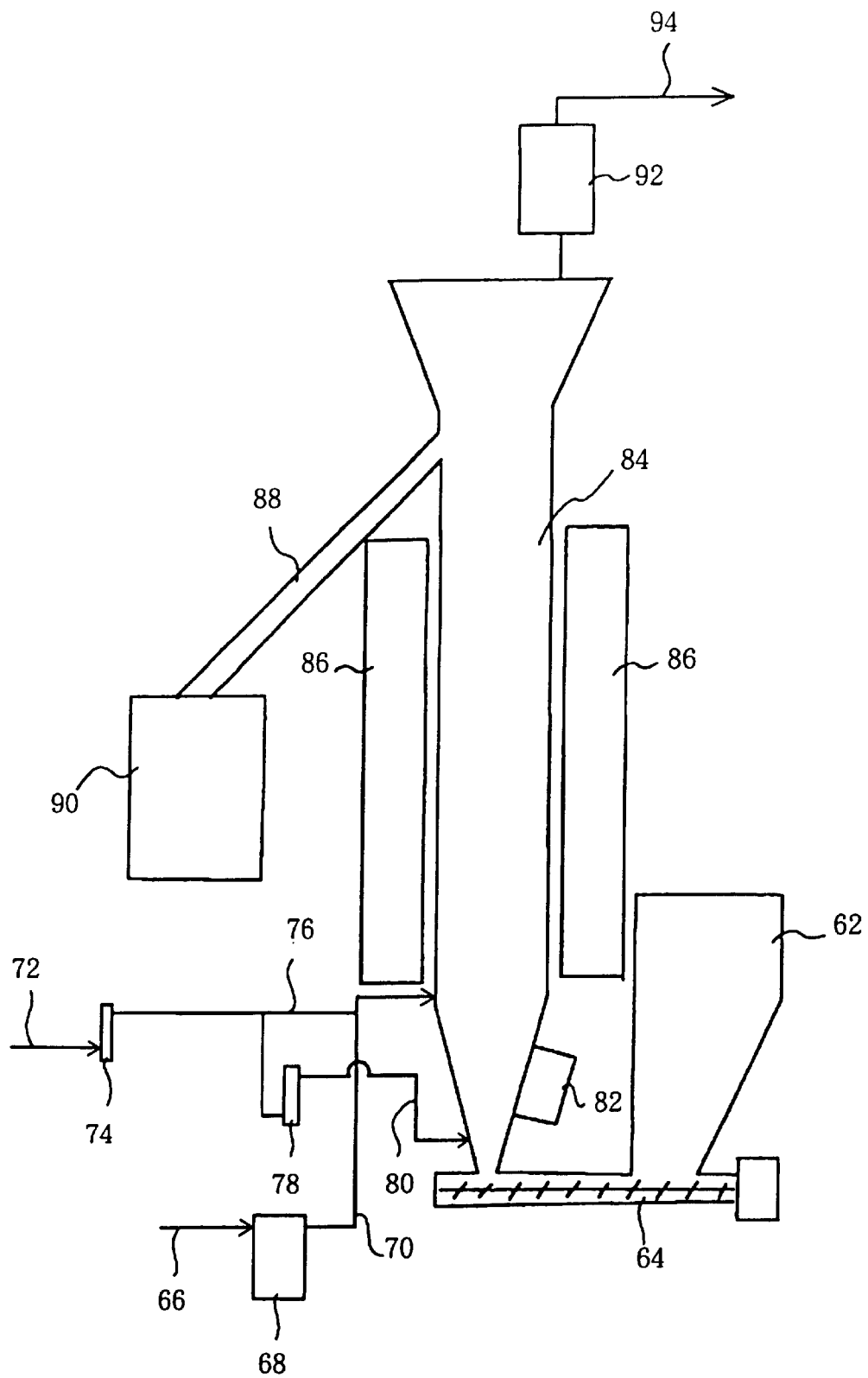
FIG. 4 is a schematic view showing other example of the apparatus for chemical vapor deposition, used for production of the anode material for lithium secondary battery, of the present invention.

FIG. 4 shows other example of the fluidized bed type chemical vapor deposition apparatus used in production of the anode material of the present invention.

In FIG. 4, a reactor 84 is a continuous vertical reactor. A electric heater 86 is fitted outside the reactor 84 so as to cover the reactor 84 and can heat the inside of the reactor 84. An electric vibrator 82 is provided at the bottom of the reactor 84 outside the reactor 84. Graphite particles in a tank 62 are fed into the bottom of the reactor 84 by a metering feeder 64 and further into the inside of the reactor 84. An anode material as a product is discharged from the top of the reactor 84 into a product receiver 90 via a product-discharging line 88.

Meanwhile, an organic substance as a carbon source 66 is fed from the bottom of the reactor 84 into the inside of the reactor 84 via a carbon source transfer line 70, by the use of a metering liquid pump 68. Also, an inert gas 72 is fed into the reactor 84 via an inert gas line 80 connected to the bottom of the reactor 84. Thereby, the graphite particles are fluidized in the reactor 84. Further, the graphite particles in the reactor 84 are vibrated by actuating the electric vibrator 82. By these actions, a stable fluidized state of graphite particles (not shown) is formed in the reactor 84. By the above operation, a carbon layer is formed on the graphite particles and an anode material is obtained.

In FIG. 4, numeral 74 refers to a gas flow meter; numeral 76 refers to an inert gas-carbon source mixing line; numeral 78 refers to a gas flow meter: numeral 92 refers to a bag filter; and numeral 94 refers to an exhaust gas line.

Figure 5:
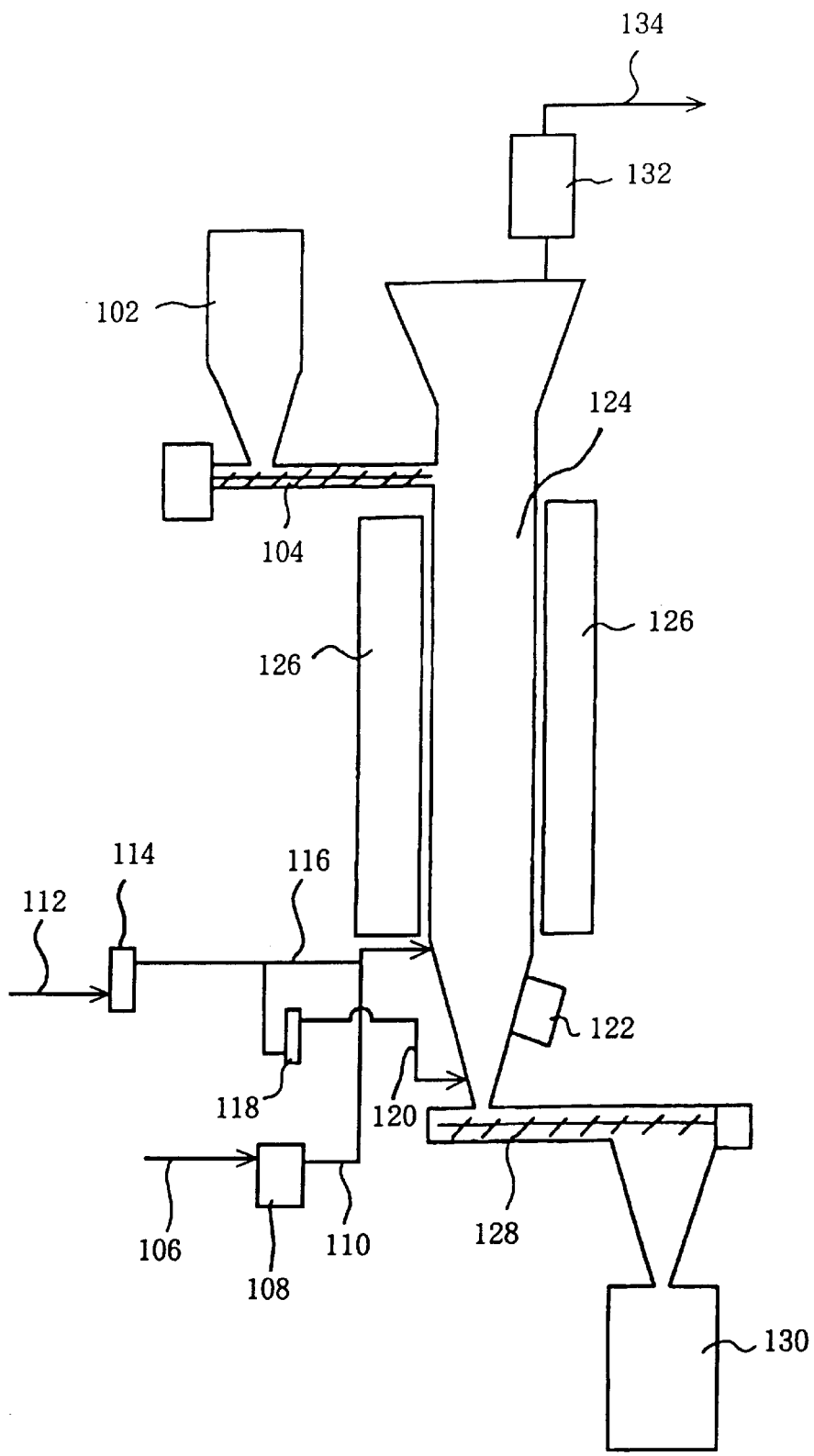
FIG. 5 is a schematic view showing still other example of the apparatus for chemical vapor deposition, used for production of the anode material for lithium secondary battery, of the present invention.

FIG. 5 shows still other example of the fluidized bed type chemical vapor deposition apparatus used in production of the anode material of the present invention.

In FIG. 5, a reactor 124 is a continuous vertical reactor. A electric heater 126 is fitted outside the reactor 124 so as to cover the reactor 124 and can heat the inside of the reactor 124. An electric vibrator 122 is provided at the bottom of the reactor 124 outside the reactor 124. Graphite particles in a tank 102 are fed into the inside of the reactor 124 from the top of the reactor 124 by a metering feeder 104. An anode material as a product is discharged from the bottom of the reactor 124 into a product receiver 130 via a product-discharging line 128.

Meanwhile, an organic substance as a carbon source 106 is fed from the bottom of the reactor 124 into the inside of the reactor 124 via a carbon source transfer line 110, by the use of a metering liquid pump 108. Also, an inert gas 112 is fed into the reactor 124 via an inert gas line 120 connected to the bottom of the reactor 124. By this feeding of inert gas, the graphite particles are fluidized in the reactor 124. Further, the graphite particles in the reactor 124 are vibrated by actuating the electric vibrator 122. By these actions, a stable fluidized state of graphite particles (not shown) is formed in the reactor 124. By the above operation, a carbon layer is formed on the graphite particles and an anode material is obtained.

In FIG. 5, numeral 114 refers to a gas flow meter; numeral 116 refers to an inert gas-carbon source mixing line; numeral 118 refers to a gas flow meter: numeral 132 refers to a bag filter; and numeral 134 refers to an exhaust gas line.

As to the method for producing a lithium-ion secondary battery using the thus-produced anode material of the present invention, there is no particular restriction. However, an example thereof is shown below.

To the anode material is added a solvent (e.g. 1-methyl-2-pyrrolidone) containing a binder (e.g. PVDF: polyvinylidene fluoride), and the mixture is kneaded sufficiently. By this procedure can be prepared an anode material slurry containing a high concentration (40% by weight or more) of the anode material. This anode material slurry is coated on a charge collector made of a metal foil (e.g. a copper foil) in a thickness of 20 to 100 $\mu$m by the use of a doctor blade or the like. The resulting material is dried to adhere the anode material particles to the metal foil charge collector. A pressure is applied as necessary for higher adhesivity and the uniform thickness of coating layer. As the binder, there can be used a known material selected from pitches, rubbers, synthetic resins, etc. Of these materials, preferred are PVDF, EPDM (ethylene-propylene-terpolymer) and CMC (caboxymethyl cellulose). Incidentally, the mixing ratio (weight ratio) of the anode material and the binder is preferably 100:2 to 100:20.

As to the cathode material used, there is no particular restriction. However, there are preferred lithium-containing compounds known to those skilled in the art, such as $LiCoO_2$, $LiNiO_2$, $LiMn_2O_4$ and the like; and their mixtures. To the powdery cathode material is added, as necessary, a conductive material; then, a binder-containing solvent, etc. are added; the resulting mixture is sufficiently kneaded. The kneaded material is molded together with a charge collector to obtain a cathode. As to the separator used, there is no particular restriction, either, and a known material can be used.

As the non-aqueous solvent used as the main solvent of electrolytic solution, there can be mentioned known aprotic solvents of low relative dielectric constant capable of dissolving a lithium salt (an electrolyte). These solvents include, for example, ethylene carbonate, dimethyl carbonate (hereinafter referred to as DMC), methyl ethyl carbonate (hereinafter referred to as MEC), propylene carbonate, diethylene carbonate, acetonitrile, propionitrile, tetrahydrofuran, γ-butyrolactone, 2-methyltetrahydrofuran, 1,3-dioxolane, 4-methyl-1,3-dioxolane, 1,2-dimethoxyethane, 1,2-diethoxyethane, diethyl ether, sulfolane, methylsulfolane, nitromethane, N,N-dimethylformamide and dimethyl sulfoxide. These solvents can be used singly or in admixture of two or more kinds.

The lithium salt used as an electrolyte includes $LiClO_4$, $LiAsF_6$, $LiPF_6$, $LiBF_4$, $LiB(c_6H_5)_4$, LiCl, LiBr, $CH_3SO_3Li$, $CF_3SO_3Li$, etc. These salts can be used singly or in admixture of two or more kinds.

By using a gel electrolyte obtained using a non-aqueous solvent (a main solvent of electrolytic solution) and an electrolyte both mentioned above, or by using a polymer electrolyte such as polyethylene oxide, polyacrylonitrile or the like, a lithium polymer secondary battery can be produced.

Further, by using a solid electrolyte, a solid-state lithium secondary battery can be produced.

The constitutions of these secondary batteries are known.

EXAMPLES

The present invention is hereinafter described more specifically by way of Examples.

In the following Examples 1 to 4 and Comparative Example 1, the following properties were measured by the following test methods.

Deposited Carbon Amount

Weight decrease was measured in an air current by the use of a thermogravimetric analyzer, GDT-50, produced by Shimadzu Corporation, and the weight decrease portion distinctly different from that of graphite particles was taken as deposited carbon amount.

Average Particle Diameter

Measured by the use of a laser diffraction type particle size distribution tester, SALD 1100, produced by Shimadzu Corporation.

Specific Surface Area

By the use of a surface area tester produced by Nihon Bell, amount of nitrogen adsorbed was measured at a liquid nitrogen temperature, and specific surface area was determined therefrom using the BET method.

Tap Density

A sample was placed in a 10-ml glass-made mess cylinder and tapped. When there was no change in sample volume, the sample volume was measured. The weight of the sample was divided by the sample volume and the value obtained was taken as the tap density of the sample.

Average Plane Spacing $d_{002}$

By the use of an X-ray diffractometer, XC-40H, produced by Toshiba, a Cu-$K_\alpha$ ray was monochromatised with Ni, and average plane spacing was measured using high-purity silicon as a standard according to a method of the Japan Society for Promotion of Scientific Research.

Examples 1 to 4 and Comparative Example 1

Natural graphite occurring in Brazil was compression-ground by the use of a vibration rod mill to obtain graphite particles having particle diameters of 45 μm or less (average particle diameter: 18 μm). The graphite particles were subjected to thermal chemical vapor deposition by the use of a fluidized bed reactor 22 shown in FIG. 3.

In FIG. 3, the reactor 42 is a batch type vertical reactor of 100 mm in diameter and 300 mm in length of to-be-heated section. An electric heater 44 is fitted outside the reactor 42 so as to cover the reactor 42 and the electric heater 44 can heat the inside of the reactor 42. A stirrer 40 is provided inside the reactor 42. 500 g of graphite particles were fed into the reactor 42 from a hopper 22. Then, nitrogen as an inert gas 30 was fed into the reactor 42 at a rate of 1 L/min via an inert gas line 38 provided at the bottom of the reactor 42. When, in this state, the reactor inside was heated and reached 900° C., benzene as a carbon source 24 was fed into the reactor 42 at the bottom at a rate of 2 mL/min by the use of a metering liquid pump 26.

The graphite particles in the reactor 42 were fluidized by the action of a gas flowing in the reactor 42 from downward to upward and also were stirred by actuating the stirrer 40 at a rotational speed (at the end of each impeller) of 1,200 cm/min. Thereby, a stable fluidized state of graphite particles (not shown) was formed in the reactor 42. In this state, the graphite particles were subjected to thermal chemical vapor deposition for a given length of time. After one batch of the deposition of given length of time was over, the product (anode material) obtained was discharged from a product outlet 46 provided at the bottom of the reactor 42.

Using the discharged product (anode material), an undersize fraction of smaller than 45 mμ in particle diameter was prepared and tested for properties when used as an anode material for lithium-ion secondary battery. The test conditions are shown in Table 1. The test results are also shown in Table 2.

TABLE 1

| Cell | Two electrodes (reference electrode: metallic lithium) |
|---|---|
| Anode material | 10 mg |
| Electrode area | 2.5 cm$^2$ |
| Binder | PVDF[*1]: 9% by weight |
| Solvent used in graphite slurry | 1-Methyl-2-pyrrolidone |
| Drying conditions | 130° C. × 5 hr in vacuum |
| Electrolyte and concentration | $LiPF_6$, 1 M/L |
| Composition of solvent of electrolytic solution | PC[*2]/MEC[*3]/EC[*4]DMC[*5] = 1/1/0.33/0.672 (volume ratio) |
| During charge at constant current | |
| Current | 1 mA |
| Current density | 0.4 mA/cm$^2$ |
| During charge at constant Voltage | |
| Voltage | 1 mV |
| Time | 1 hr |
| Range of discharge capacity measurement | 1 mV to 1.5 V |

[*1]PVDF: polyvinylidene fluoride
[*2]PC: propylene carbonate
[*3]MEC: methyl ethyl carbonate
[*4]EC: ethylene carbonate
[*5]DMC: dimethyl carbonate

TABLE 2

| | Ex. 1 | Ex. 2 | Ex. 3 | Ex. 4 | Comp. Ex. 1 |
|---|---|---|---|---|---|
| Time of chemical vapor deposition (min) | 30 | 60 | 120 | 240 | 0[*1] |

TABLE 2-continued

| | Ex. 1 | Ex. 2 | Ex. 3 | Ex. 4 | Comp. Ex. 1 |
|---|---|---|---|---|---|
| Amount of deposited carbon (% by weight) | 7 | 14 | 20 | 24 | 0 |
| Average particle diameter ($\mu$m) | 14.6 | 17.0 | 17.2 | 20.2 | 12.6 |
| Specific surface area ($m^2$/g) | 3.35 | 2.75 | 1.90 | 0.98 | 7.08 |
| Tap density (g/$cm^3$) | 0.782 | 0.837 | 0.876 | 0.929 | 0.775 |
| Average plane spacing of carbon layers (nm) | 0.33550 | 0.33548 | 0.33546 | 0.33548 | (0.33520)[*2] |
| Charge - discharge test results | | | | | |
| (1) Discharge capacity (mAh/g) | 360 | 355 | 353 | 353 | [*3] |
| (2) Coulombic efficiency (%) | 90.2 | 91.2 | 92.3 | 92.2 | [*3] |

[*1]Graphite particles were not subjected to chemical vapor deposition
[*2]An average plane spacing of graphite particles
[*3]Measurement was impossible due to PC decomposition.

As seen in Table 2, the anode materials of Examples 1 to 4 had an average plane spacing $d_{002}$ of carbon layers, of less than 0.337 nm, and comprised graphite particles and a crystalline carbon layer covering the graphite particles from the results of NMR spectrometry and electron microscope observation. Moreover, as seen in the charge-discharge test results, these anode materials caused no decomposition of electrolytic solution solvent and showed a high discharge capacity and a high coulombic efficiency.

Figure 6:
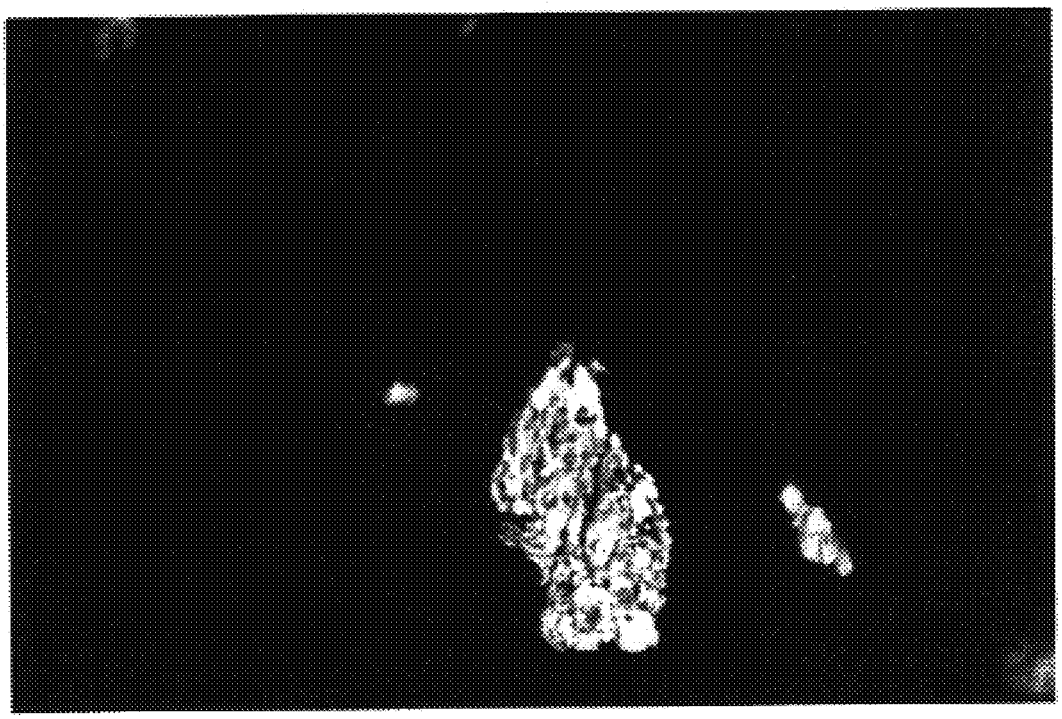
FIG. 6 is a polarized light microscope photograph showing an example of the anode material for lithium secondary battery, of the present invention.

The anode material of Example 3 was embedded in a polyester resin and polished according to an ordinary method, after which the structure of the anode material was observed under a reflecting polarizing microscope. As a result, as seen in FIG. 6, the anode material showed optical anisotropy in all the parts. So it was confirmed the carbon layer formed on graphite particles was crystalline.

Example 5

Production of Actual Battery

A cathode active substance (LiCoO$_2$) and a conductive material (artificial graphite) were mixed at a weight ratio of 9:1. The mixture was dispersed in a 1-methyl-2-pyrrolidone solution containing 5% by weight of PVDF, to prepare a LiCoO$_2$ slurry. The slurry was coated on an aluminum foil in a thickness of 60 m$\mu$ using a doctor blade, and the resulting material was dried at 130° C. for 2 hours to produce a cathode.

The anode material of Example 3 was dispersed in a 1-methyl-2-pyrrolidone solution containing 9% by weight of PVDF, to prepare a slurry containing 65% by weight of the anode material. The anode material slurry was coated on a copper foil in a thickness of 30 $\mu$m using a doctor blade, and the resulting material was dried at 130° C. for 2 hours to produce an anode.

Cellguard produced by Hoechst Celanese was used as a separator. The cathode and the anode both produced above was laminated via the separator, and the laminate was wound. The resulting roll was placed in a stainless steel can functioning also as an anode. Into the anode can was injected a solution of PC/methyl carbonate/EC (volume ratio =1:1:1.5) containing 1 M/L of LiPF$_6$ as an electrolyte. The can was covered with a cap functioning also as a cathode, whereby a lithium-ion secondary battery was produced.

The battery was subjected to charge and discharge at 200 mA between 4.2 V and 2.7 V. As a result, the battery had a volume energy density of 377 wh/L. The battery was also subjected to charge and discharge of 1,000 times, and the discharge amount of 1,000th time was 92% of the initial discharge amount. The discharge capacity at 60° C. was 102% as compared with that at 25° C. and the discharge capacity at 0° C. was 98% on the same basis.

In Example 6 and Comparative Examples 2 and 3, the following properties were measured by the following test methods.

Deposited Carbon Amount

Weight decrease was measured in an air current by the use of a thermogravimetric analyzer, GDT-50, produced by Shimadzu Corporation, and the weight decrease portion distinctly different from that of graphite particles was taken as deposited carbon amount.

Average Particle Diameter

Measured by the use of a laser diffraction type particle size distribution tester, SALD 1100, produced by Shimadzu Corporation.

Specific Surface Area

By the use of a surface area tester, BELSORB 28, produced by Nihon Bell, amount of nitrogen adsorbed was measured at a liquid nitrogen temperature, and specific surface area was determined therefrom using the BET method.

Tap Density

A sample was placed in a 10-ml glass-made mess cylinder and tapped. When there was no change in sample volume, the sample volume was measured. The weight of the sample was divided by the sample volume and the value obtained was taken as the tap density of the sample.

Average Plane Spacing $d_{002}$

By the use of an X-ray diffractometer, LINT 1111, produced by Rigaku, a Cu-K$_\alpha$, ray was monochromatised with Ni, and average plane spacing was measured using high-purity silicon as a standard according to a method of the Japan Society for Promotion of Scientific Research.

Transmission Electron Microscope and Electron Beam Diffraction

Photographing of bright field image and electron beam diffractometry were conducted using a transmission electron microscope, 2000 FX, produced by Japan Electron Optical Laboratory.

$^7$Li Solid NMR Spectrum

A wide line probe was fitted to a solid NMR spectrometer, DSX 300 wb, produced by Bruker, and measurement was made using an aqueous lithium chloride solution as a standard.

Example 6

Natural graphite occurring in Brazil was compression-ground by the use of a vibration rod mill. The ground graphite was subjected to sieving with a 53-μm sieve to obtain graphite particles having a tap density of 0.800 g/cm$^3$, as an undersize fraction. The graphite particles were subjected to thermal chemical vapor deposition by the use of a fluidized bed reactor 42 shown in FIG. 3.

In FIG. 3, the reactor 42 is a batch type vertical reactor of 500 mm in diameter and 1,500 mm in length of to-be-heated section. An electric heater 44 is fitted outside the reactor 42 so as to cover the reactor 42 and the electric heater 44 can heat the inside of the reactor 42. A stirrer 40 is provided inside the reactor 42. 60 Kg of graphite particles were fed into the reactor 42 from a hopper 22.

Then, nitrogen as an inert gas 30 was fed into the reactor 42 at a rate of 50 L/min via an inert gas line 38 provided at the bottom of the reactor 42. When, in this state, the inside of the reactor 42 was heated and reached 1,000° C., toluene as a carbon source 24 was fed into the reactor 42 at the bottom at a rate of 158 mL/min by the use of a metering liquid pump 26 (molar concentration of toluene in toluene-nitrogen mixed gas =40%). The graphite particles in the reactor 42 were fluidized by the action of a gas flowing in the reactor 42 from downward to upward and also were stirred by actuating the stirrer 40 at a rotational speed (at the end of each impeller) of 1,200 cm/min. Thereby, a stable fluidized state of graphite particles (not shown) was formed in the reactor 42. In this state, the graphite particles were subjected to thermal chemical vapor deposition for 120 minutes. After one batch of the deposition was over, the product (anode material) obtained was discharged from a product outlet 46 provided at the bottom of the reactor 42.

Using the discharged product (anode material), an undersize fraction of smaller than 53 μm in particle diameter was prepared and tested for properties when used as an anode material for lithium-ion secondary battery. The test conditions are shown in Table 3, and the test results are shown in Table 4.

TABLE 3

| Cell | Two electrodes (reference electrode: metallic lithium) |
|---|---|
| Anode material | 10 mg |
| Electrode area | 2.5 cm$^2$ |
| Binder | PVDF*$^1$: 9% by weight |
| Solvent used in graphite slurry | 1-Methyl-2-pyrrolidone |
| Drying conditions | 130° C. × 5 hr in vacuum |
| Electrolyte and concentration | LiPF$_6$, 1 M/L |
| Solvent composition | PC*$^2$/EC*$^3$/MEC*$^4$= |
| Electrolytic solution A | 25/25/50 (vol. %) |
| Electrolytic solution B | 50/17/33 (vol. %) |
| Electrolytic solution C | 70/10/20 (vol. %) |
| During charge at constant current | |
| Current | 1 mA |
| Current density | 0.4 mA/cm$^2$ |
| During charge at constant voltage | |
| Voltage | 1 mV |
| Time | 1 hr |
| Range of discharge capacity measurement | 1 mV to 1.5 V |

*$^1$PVDF: polyvinylidene fluoride
*$^2$PC: propylene carbonate
*$^3$EC: ethylene carbonate
*$^4$MEC: methyl ethyl carbonate

TABLE 4

| | Ex. 6 | Comp. Ex. 2 | Comp. Ex. 3 |
|---|---|---|---|
| Time of chemical vapor deposition (min) | 120 | 120 | 120*$^1$ |
| Carbon layer (% by weight) | 17.6 | 16.8 | 17.1 |
| Average particle diameter (μm) | 19.5 | 20.8 | 20.2 |
| Specific surface area (m$^2$/g) | 2.00 | 2.55 | 2.06 |
| Tap density (g/cm$^3$) | 0.852 | 0.851 | 0.833 |
| Average spacing between carbon layers (nm) | 0.33548 | 0.33550 | 0.33582 |
| Charge-discharge test results (electrolytic solution A) | | | |
| (1) discharge capacity (mAh/g) | 353 | 354 | 325 |
| (2) Coulombic efficiency (%) | 88.2 | 49.3 | 65.2 |
| Charge - discharge test results (electrolytic solution B) | | | |
| (1) discharge capacity (mAh/g) | 355 | *$^2$ | 311 |
| (2) Coulombic efficiency (%) | 89.0 | *$^2$ | 30.6 |
| Charge - discharge test results (electrolytic solution C) | | | |
| (1) discharge capacity (mAh/g) | 345 | *$^2$ | *$^2$ |
| (2) Coulombic efficiency (%) | 87.7 | *$^2$ | *$^2$ |

*$^1$Time of heat treatment required for carbonization of covering pitch
*$^2$Measurement was impossible due to PC decomposition.

Figure 7:
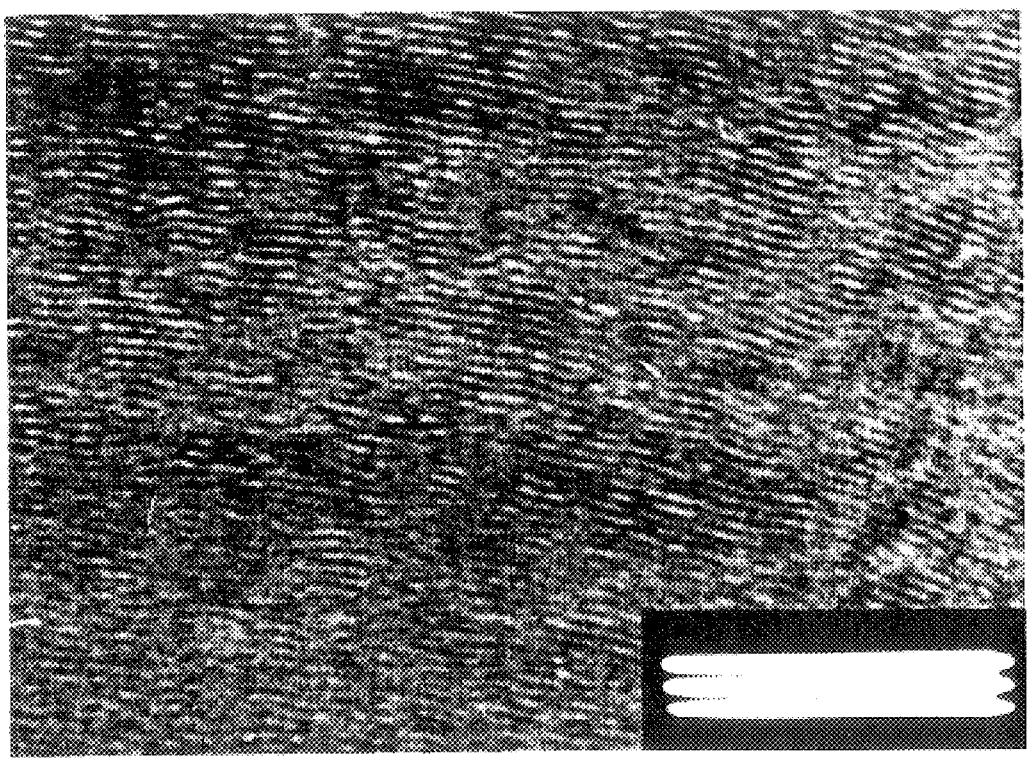
FIG. 7 is a transmission electron microscope photograph showing an example of the surface carbon layer of the anode material for lithium secondary battery, of the present invention.
Figure 8:
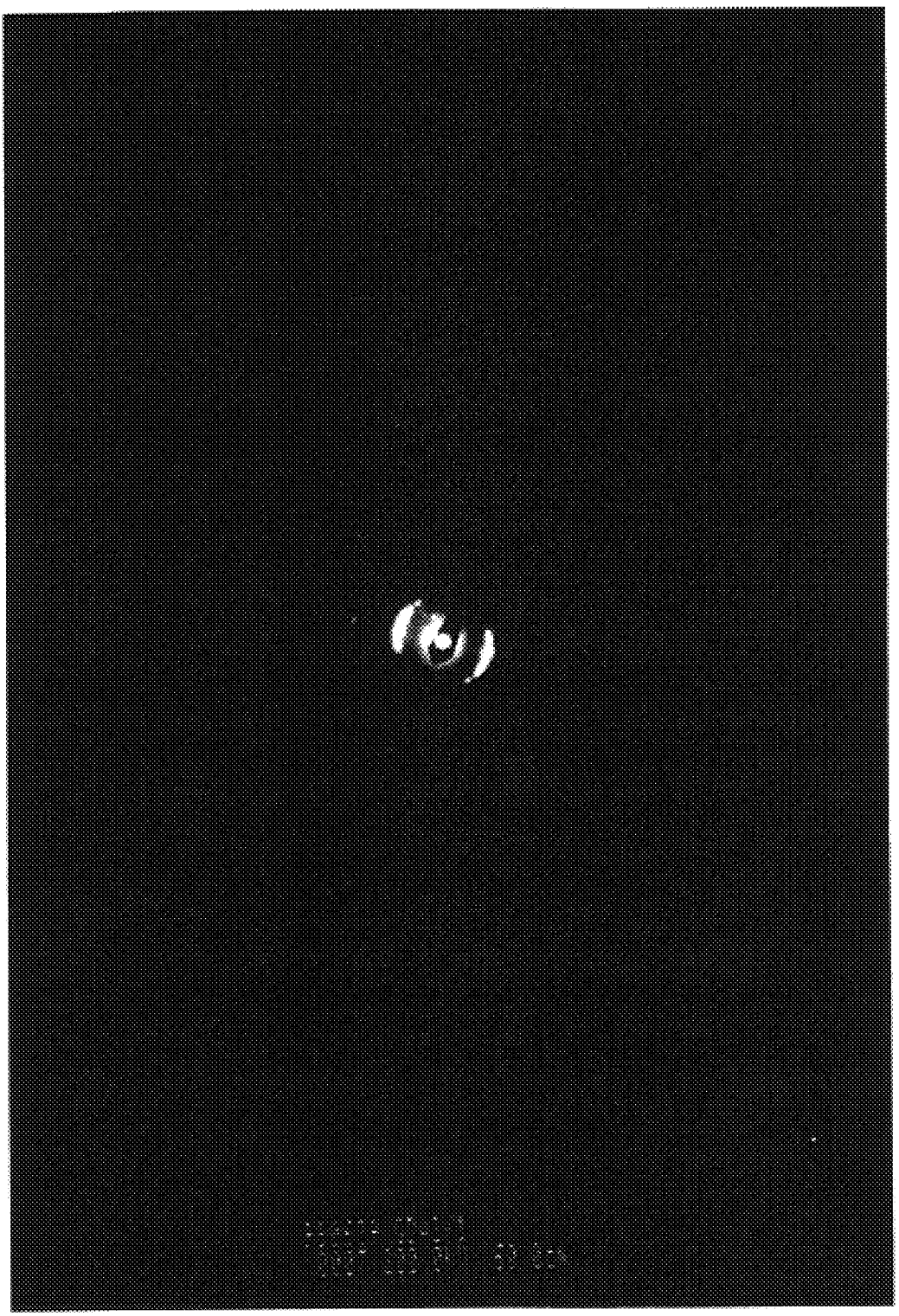
FIG. 8 is an electron diffraction photograph showing an example of the surface carbon layer of the anode material for lithium secondary battery, of the present invention.

The anode material of Example 6 was subjected to electron beam diffractometry using a transmission electron microscope to examine the structure of the carbon layer. The anode material had a plate-like shape as shown in FIG. 1. Shown in FIG. 7 is a photograph of transmission electron microscope obtained by applying an electron beam to the side carbon layer 14 parallel to the plane direction (i.e. a Y direction in FIG. 2) of the side carbon layer 14 of the anode material. As shown in FIG. 7, a clear lattice image of carbon 002 plane was seen in the carbon layer of the anode material. The spacing of the lattice image, i.e. the average spacing between adjacent carbon 002 planes was 0.33645 nm. Shown in FIG. 8 is a photograph of electron beam diffraction obtained by applying an electron beam to the side carbon layer 14 parallel to the plane direction (i.e. a Y direction in FIG. 2) of the side carbon layer 14. FIG. 8 shows an image of electron beam diffraction by carbon 002 plane of crystalline carbon.

Based on the above results, it has been recognized that the carbon 002 planes of the side carbon layer 14 are parallel to the side surfaces (110 plane) of the graphite particles 2.

Also, an electron beam of a transmission electron microscope was applied to the top carbon layer 16 formed on the top flat area of the plate-shaped anode material, in a direction vertical to the carbon layer 16 (i.e. an X direction in FIG. 2), to obtain an electron beam diffraction photograph.

The photograph showed a carbon 002 plane of crystalline carbon. It has been recognized that the carbon 002 planes of the side carbon layer 16 are parallel to the top surfaces (002 plane) of the graphite particles 2.

Figure 9:
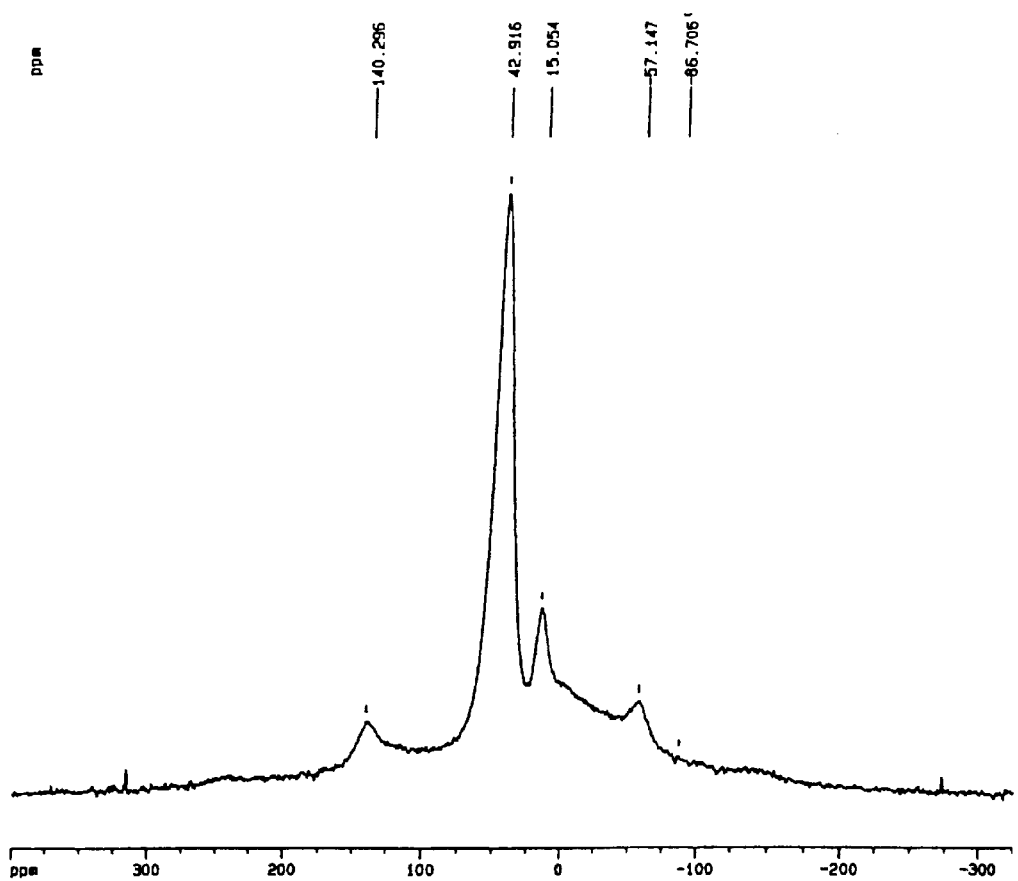
FIG. 9 is a $^7$Li-NMR spectrum showing an example of the present anode material for lithium secondary battery, into which lithium ion has been intercalated.

Next, the anode material was put in a charge state (a state in which lithium ion was intercalated into the anode material) and measured for $^7$Li-NMR absorption spectrum. The spectrum is shown in FIG. 9. Lithium ion (intercalated into natural graphite) was observed at 42.9 ppm; also, lithium ion (intercalated into or occluded by crystalline carbon) was observed at 15.1 ppm.

From the above, it is clear that, in the anode material, (1) the graphite particles are covered with a carbon layer in a state that the surfaces of the graphite particles and the carbon 002 plane of the carbon layer are parallel and (2) the carbon layer formed on the graphite particles is crystalline.

Comparative Example 2

10 g of the same graphite particles as used in Example 6 was fed into a fixed bed chemical vapor deposition reactor, and chemical vapor deposition was conducted using a toluene-nitrogen mixed gas of the same toluene concentration (40 mole %) as in Example 6. The resulting anode material was tested for properties when used as an anode material for lithium-ion secondary battery, under the conditions of Table 3. The test results are shown in Table 4. As shown in Table 4, the anode material produced by fixed bed chemical vapor deposition was incomplete in coverage of graphite particle surfaces with carbon.

Incidentally, the fixed bed chemical vapor deposition reactor was a quartz-made cylindrical reactor provided with a graphite plate inside. Graphite particles were heaped on the graphite plate. While the graphite particles were heated from outside, a mixed gas was fed into the reactor. The reactor was 95 mm in diameter and 800 mm in length, and the graphite plate had a plate-like shape of 95 mm×120 mm. The temperature of vapor deposition was 1,000° C.

Comparative Example 3

100 g of the same graphite particles as used in Example 6 and 25 g of a mesophase pitch (softening point: 295° C., fixed carbon content: 82% by weight) of coal tar origin were kneaded at 320° C., then cooled, and ground. The resulting material was heated at 330° C. for 30 minutes in an air current to infusibilize the pitch covering the graphite particles. Then, the material was heated to 1,000° C. at a temperature elevation rate of 10° C./min. Thereafter, a heat treatment was conducted at the same temperature for 120 minutes to produce an anode material. The anode material was tested for properties when used as an anode material for lithium-ion secondary battery, under the conditions of Table 3. The test results are shown in Table 4. As shown in Table 4, the anode material produced by kneading of graphite particles with a pitch and subsequent carbonization was incomplete in coverage of graphite particle surfaces with carbon.

Figure 10:
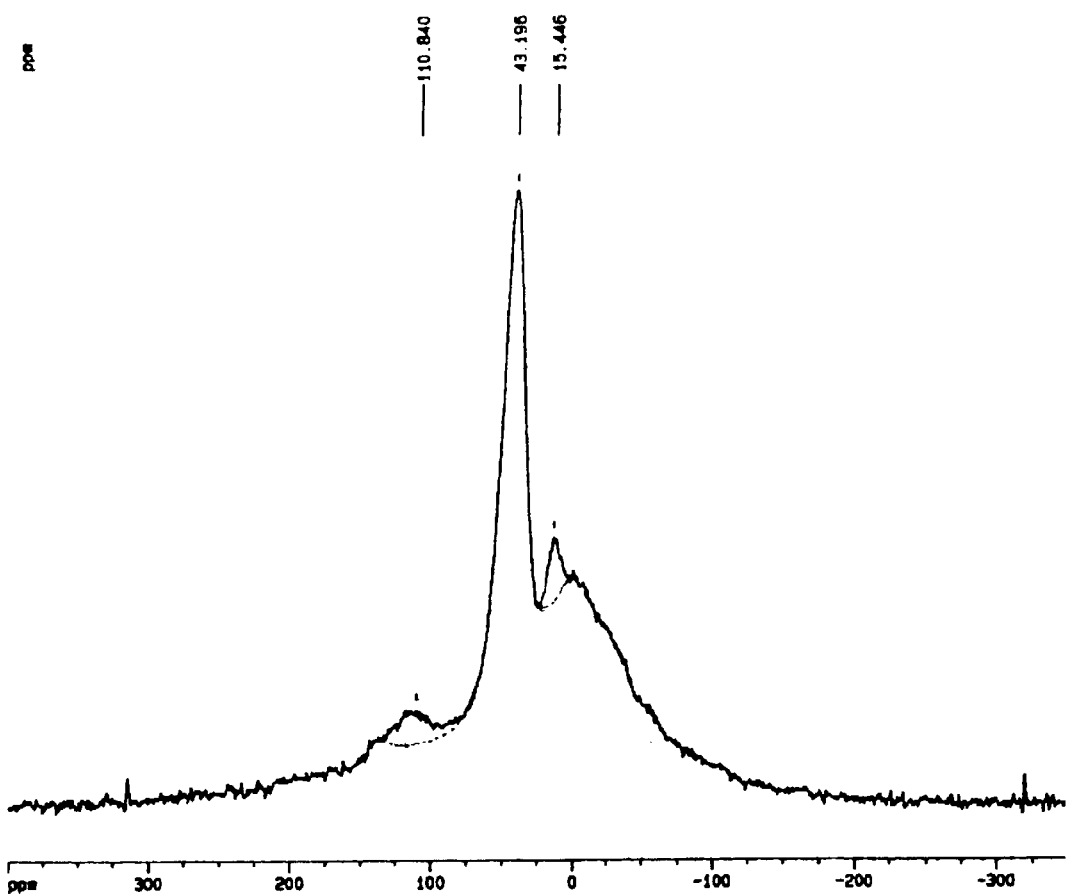
FIG. 10 is a $^7$Li-NMR spectrum showing the anode material for lithium secondary battery, of Comparative Example 3, into which lithium ion has been intercalated.

The anode material was put in a charge state (a state in which lithium ion was intercalated into the anode material) and measured for $^7$Li-NMR absorption spectrum. The spectrum is shown in FIG. 10. The spectrum showed absorption by the lithium ion intercalated into crystalline carbon, at 15 ppm and absorption by the lithium ion intercalated into isotropic carbon, at 110 ppm.

As described above, the carbon layer formed in Example 6 on graphite particles by fluidized bed chemical vapor deposition is a crystalline carbon layer and its carbon 002 plane covers the whole surfaces of graphite particles.

Meanwhile, both the carbon formed in Comparative Example 2 on graphite particles by fixed bed chemical vapor deposition and the carbon formed in Comparative Example 3 on graphite particles by kneading of graphite particles with a pitch and subsequent carbonization are incomplete in coverage of graphite particle surfaces.

The above fact has not been anticipated at all from conventional anode materials for lithium-ion secondary battery, comprising graphite particles and a low-crystalline carbon layer covering the graphite particles.

In chemical vapor deposition using a fluidized bed, graphite particles are put in a floating state by an organic substance gas as a carbon source, an inert gas (fed as necessary) and the decomposition gas of the organic substance; therefore, the whole surfaces of the graphite particles are uniformly covered with these gases; as a result, the whole surfaces of the graphite particles can be covered with a small amount of carbon uniformly and completely.

Further in the anode material of the present invention obtained by appropriately setting the conditions of fluidized bed chemical vapor deposition, the carbon layer is crystalline and its carbon 002 plane covers the whole surfaces of graphite particles. Moreover, even when formed in a thickness smaller than in conventional anode materials, the carbon layer can cover the whole surfaces of graphite particles uniformly and completely. As a result, advantages such as the followings result:

(1) since the amount of carbon covering graphite particles is small, a higher charge-discharge speed is obtained, (2) since the amount of carbon covering graphite particles is small, the proportion of graphite in anode material is high, resulting in high discharge capacity, (3) since carbon covers the whole surfaces of graphite particles uniformly and completely, a high coulombic efficiency is obtained, and (4) since carbon covers the whole surfaces of graphite particles uniformly and completely, the decomposition of solvent (e.g. PC) is suppressed; as a result, the battery produced using the present anode material eliminates the risk of explosion caused by the decomposition gas of solvent.

The above advantages are not at all anticipated not only from conventional anode materials for lithium-ion secondary battery, comprising graphite particles and a low-crystalline carbon layer covering the graphite particles, but also from an anode material comprising graphite particles and carbon deposited thereon by fixed bed chemical vapor deposition or an anode material obtained by kneading of graphite particles with a pitch and subsequent carbonization.

What is claimed is:

1. An anode material for lithium secondary battery, comprising:

a graphite particle having a maximum particle diameter of 100 μm or less; and a crystalline carbon layer covering the whole surface of the graphite particle in an amount of 2–30% by weight based on the weight of the graphite particle;
wherein the whole surface of the graphite particle is covered with a carbon layer in a state that the surface of the graphite particle and the carbon 002 plane of the carbon layer are parallel.

2. An anode material for lithium secondary battery according to claim 1, which has absorption spectra at 40 to 50 ppm and 10 to 30 ppm when lithium ion is intercalated thereinto and the resulting material is measured for $^7$Li-NMR spectrum using lithium chloride as a standard.

3. An anode material for lithium secondary battery according to claim 1, wherein the carbon layer shows optical anisotropy under a polarizing microscope.

4. An anode material according to claim 1, wherein natural graphite is used as the graphite particle.

5. A lithium secondary battery produced using an anode material set forth claim 1.

6. A process for producing an anode material for lithium secondary battery, said anode material comprising:

a graphite particle having a maximum particle diameter of 100 µm or less; and a crystalline carbon layer covering the surface of the graphite particle in an amount of 2–30% by weight based on the weight of the graphite particle;

which process comprises subjecting graphite particles to chemical vapor deposition treatment using an organic substance gas or a mixed gas consisting of an organic substance gas and an inert gas, in a fluidized bed type reactor to form the anode material.

7. A process according to claim 6, wherein the carbon layer is a crystalline carbon layer and the whole surface of the graphite particle is covered with a carbon 002 plane of the crystalline carbon layer.

8. A process according to claim 6, wherein the molar concentration of the organic substance gas in the mixed gas is 2 to 50% and the temperature of the treatment for chemical vapor deposition is 900 to 1,200° C.

9. A process according to claim 6, wherein natural graphite is used as the graphite particle.

10. The anode material according to claim 1, wherein the carbon layer has an average $d_{002}$ spacing of less than 0.337 nm.

11. The anode material according to claim 1, wherein the carbon layer has an average $d_{002}$ spacing of 0.3352 to 0.3369 nm.

12. The anode material according to claim 1, wherein the carbon layer has an average $d_{002}$ spacing of 0.3352 to 0.3359 nm.

13. The anode material according to claim 1, wherein the average particle diameter of the graphite particle is 1 to 100 µm.

14. The anode material according to claim 1, wherein the average particle diameter of the graphite particle is 5 to 30 µm.

15. The process according to claim 6, wherein the carbon layer has an average $d_{002}$ spacing of less than 0.337 nm.

16. The process according to claim 6, wherein the carbon layer has an average $d_{002}$ spacing of 0.3352 to 0.3369 nm.

17. The process according to claim 6, wherein the carbon layer has an average $d_{002}$ spacing of 0.3352 to 0.3359 nm.

18. The process according to claim 6, wherein the average particle diameter of the graphite particle is 1 to 100 µm.

19. The process according to claim 6, wherein the average particle diameter of the graphite particle is 5 to 30 µm.

* * * * *